UNITED STATES PATENT OFFICE.

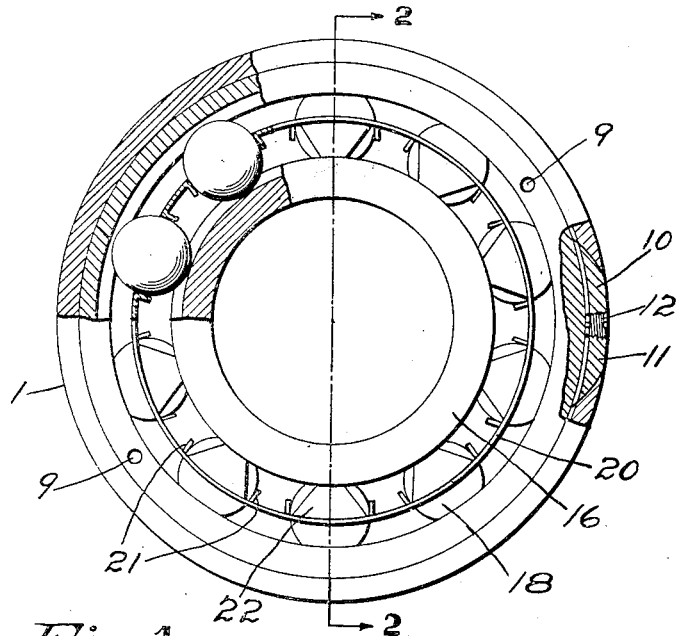
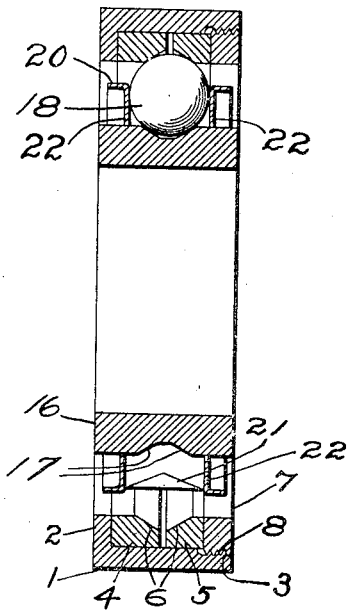
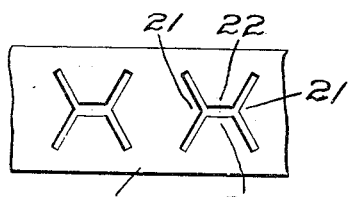
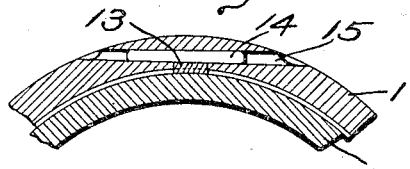
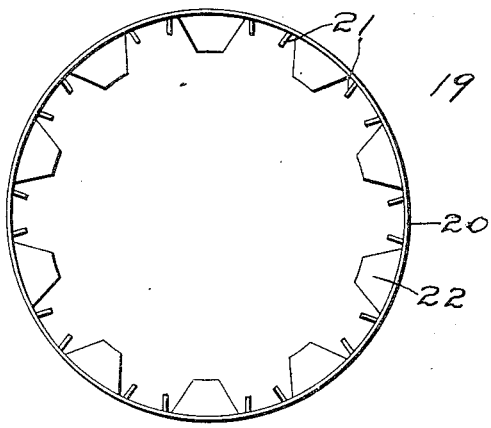
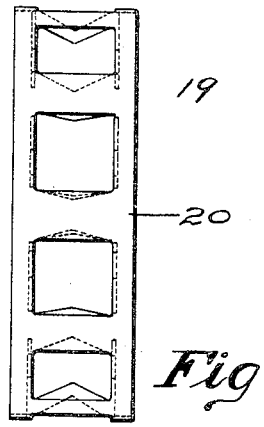

WILLIAM P. O'TOOLE, OF WINTHROP, MASSACHUSETTS.

BALL-BEARING.

1,235,235.  Specification of Letters Patent.  Patented July 31, 1917.

Application filed April 4, 1917. Serial No. 159,644.

*To all whom it may concern:*

Be it known that I, WILLIAM P. O'TOOLE, a citizen of the United States, residing at Winthrop, in the county of Suffolk and State of Massachusetts, have invented certain Improvements in Ball-Bearings, of which the following description, in connection with the accompanying drawings, is a specification, like reference characters on the drawings indicating like parts in the several figures.

This invention relates to bearings and more particularly to ball bearings of the type in which the balls are spaced from each other within a cage sustained between the inner and outer bearing cones.

The cages, as heretofore constructed, have been provided with pockets for the balls to rotate in, the frictional engagement between the pockets and the balls being such that the cages are supported entirely by the balls between the inner and outer cones. This construction subjects the balls to considerable wear and one object of the present invention is to overcome this disadvantage. In accordance with this object a feature of the present invention contemplates the provision of means integral with the cage for supporting the cage from one of the bearing cones thus permitting the balls to rotate loosely in the pockets of the cage without that frictional engagement necessary for the balls to support the cage.

Bearings of this general type have been difficult to assemble and one object of the present invention is to simplify the construction and increase the ease of assembling and dismantling the bearing. In accordance with this object a casing or drum is provided within which all the parts of the bearing may be placed from one side thereof, while maintaining the position relative to each other which they have when the bearing is ready for use.

Difficulty has also been experienced in bearings of this type in maintaining the cage constantly in alinement with the bearing cones and a further object of the invention is to correct this difficulty. In accordance with this object a feature of the invention contemplates the provision of means which will provide a double side bearing for the cage on the rim of one of the bearing cones thus maintaining the alinement of the cage and preventing particularly, any sidewise wabbling or transverse, angular displacement.

A still further object of the invention is to provide, in a bearing of the type indicated, means for adjustment with provision for maintaining this adjustment. To this end the outer bearing cone is formed in two parts, one of which may be held in an adjustable manner against the other to regulate the pressure upon the bearing members, with a coöperating readily removable locking device which, when in position retains said adjustable part secure in its adjusted position.

The various features of the present invention will be best understood from an inspection of the accompanying drawing illustrating the preferred embodiment of the invention, in which, Figure 1 is an elevation partly in section of the ball bearing;

Fig. 2 is a sectional elevation on the line 2—2, Fig. 1;

Fig. 3 is a detail in plan of the ring for the cage showing the manner in which the wings are formed therein;

Fig. 4 is an elevation of the cage;

Fig. 5 is a detail in plan of the cage; and

Fig. 6 is a detail sectional elevation of a modified form of locking device for the bearing.

Referring to the embodiment of the invention illustrated in the drawing a casing or drum 1 is provided at one end with an inwardly projecting annular flange 2 (Fig. 2) which acts as a bearing retaining abutment. At its other end the casing 1 is provided with internal screw threads 3 (Fig. 2).

The outer bearing cone consists of two annular sections or rings 4 and 5, respectively, each of which is provided upon one inner edge with a suitable shaped ball engaging face or raceway 6. The ring 4 forms a tight fit with the inner wall of the casing and rests upon or abuts against the inner face of the flange 2, the construction being such that there is no relative movement of these parts when the bearing is in use. The other cone ring 5, in the illustrated embodiment, is held in place by a third ring 7 which is provided upon its outer circumferential face with external screw threads 8 for engagement with the complementary threads 3 in the wall of the casing. The ring 7 is provided at diametrically opposite points on its outer face with pins 9 which may be engaged by a suitable tool and the ring 7 rotated to adjust the ring 5 with respect to the raceway of the ring 4. The raceway 6 of the ring 5 may be securely locked in any position to which it may be adjusted by a locking device comprising a pair of wedges 10 and 11 which are provided with teeth on their bottom faces which engage the screw threads on the ring 7. The wedges are expanded to clamp the ring 7 in position by a screw 12 which is countersunk beneath the outer circumferential face of the casing 1. In an alternative construction the ring 7 may be locked in position by a key 13 (Fig. 6) which is provided with teeth on its bottom face for engagement with the threads 8 on the ring 7. The key is clamped on the ring by a tapered pin 14 which is driven into place through a hole 15 formed in the casing 1.

The inner bearing cone is indicated at 16 and comprises a separate cylindrical member provided with a suitably shaped raceway 17 on its outer circumferential face. Between this inner bearing cone and the outer cone rings 4 and 5 a series of bearing balls 18 are arranged and seated in the raceways 6 and 17.

In order to retain these balls in position between the inner and outer bearing cones and in proper spaced relation to each other I provide a cage 19 comprising a ring 20 mounted between the inner and outer bearing cones. The ring 20 is provided with a series of sets of wings, each set comprising a pair of transverse wings 21 and a pair of longitudinal wings 22. The wings 22 engage and rotate on the inner bearing cone and to this end the bottoms thereon are shaped to conform to the curvature of the inner cone. The bearing balls 18 are loosely carried in the pockets formed by the wings and are thus permitted to rotate freely without friction.

In forming the wings the ring 20 is subjected to the action of a suitably shaped die which removes a four-branched piece of material from the peripheral face of the ring thus separating the four wings from the body portion of the ring. The wings are then bent downwardly to form the pockets for the balls.

From the foregoing description, the construction and several advantages of my improved ball bearing will be clearly and fully understood. By mounting the cage rotatably upon the inner cone bearing provision is made for the rotation of the bearing balls in the pockets with a minimum of friction. Moreover, the double bearing afforded by the engagement of the wings 22, at opposite sides of the cage, upon the inner bearing cone prevents all transverse movement or wabbling of the cage relative to the bearing cones. It will be apparent to those skilled in the art that the ring 7 may be dispensed with and screw threads formed on the peripheral face of the ring 5. With this construction it is difficult to harden the raceway in the ring without distorting the screw threads so I prefer to employ a ring, separate from the raceway rings, to carry the screw threads.

While the preferred embodiment of the present invention has been specifically illustrated and described, the present invention is not limited to its preferred embodiment, but may be embodied in other constructions within the scope of the invention as set forth in the following claims:—

1. In a bearing, inner and outer bearing cones having raceways, a series of rotatable bearing members arranged between the cones, and a cage for the bearing members supported directly from one of the bearing cones only by a plurality of wings spaced apart on the cage.

2. In a bearing, inner and outer bearing cones having raceways, a series of rotatable bearing members arranged between the cones, and a one-piece cage for the bearing members provided with a plurality of spaced wings rotatably mounted on the inner bearing cone only.

3. In a bearing, inner and outer bearing cones having raceways, a series of rotatable bearing members engaged between said cones, a cage for said bearing members arranged concentrically between said cones and out of engagement therewith, means integral with said cage for spacing the bearing members from each other and for bearing on one of said cones at both sides of the bearing members only to maintain the cage in alinement with the cones.

4. In a bearing, inner and outer bearing cones having raceways, a series of rotatable bearing members engaged between said cones, a cage for said bearing members arranged concentrically between said cones and out of engagement therewith, means integral with said cage for spacing the bearing members from each other and for bearing on the inner bearing cone at both sides of the bearing members only to maintain the cage in alinement with the cones.

5. In a bearing, inner and outer bearing cones having raceways, a series of rotatable bearing members arranged between the cones, and a cage for the bearing members comprising a ring mounted concentrically between the cones provided with a plurality of wings arranged to engage the inner cone.

6. In a bearing, inner and outer bearing cones having raceways, a series of rotatable bearing members arranged between the cones, and a cage for the bearing members comprising a ring mounted concentrically between the cones provided with a plurality of wings having the bottoms thereon conformed to the curvature of the inner cone.

7. In a bearing, inner and outer bearing cones having raceways, a one-piece cage provided with a series of sets of wings forming pockets, one pair of wings of each set being rotatably mounted on the inner bearing cone, and a series of bearing members loosely mounted in said pockets.

8. In a bearing, inner and outer bearing cones having raceways, a series of rotatable bearing members arranged between the cones, and a cage for the bearing members provided with a series of pockets for loosely retaining the bearing members, each pocket comprising four wings integral with the cage, two of said wings engaging the inner bearing cone.

9. In a bearing, inner and outer bearing cones having raceways, a series of rotatable bearing members arranged between the cones, and a cage for the bearing members provided with a series of pockets for loosely retaining the bearing members each pocket comprising four wings integral with the cage, two of said wings having the bottoms thereon shaped to conform to the curvature of the inner bearing cone.

10. In a bearing, a casing provided with an annular flange, an outer bearing cone comprising a pair of rings coöperating to form a raceway, one of said rings being arranged within the casing against the annular flange, an adjustable ring for holding the other ring in position having threads on the peripheral face thereof, a key having threads coöperating with the threads on the adjustable ring, and means for locking the key in position on the adjustable ring.

11. In a bearing, a casing provided with an annular flange, an outer bearing cone comprising a pair of rings coöperating to form a raceway, bearing members mounted in said raceway, means for variably pressing the rings together to regulate the pressure on the bearing members, a locking device for retaining the rings in adjusted position comprising a key coöperating with said means and a tapered pin for locking the key in position.

12. In a bearing, a cage comprising a ring having a four-branched piece of material removed from its peripheral face forming a set of transverse and longitudinal wings, the longitudinal wings having curved bottoms thereon.

In testimony whereof I have signed my name to this specification.

WILLIAM P. O'TOOLE.